United States Patent [19]

Roth et al.

[11] Patent Number: 5,576,399

[45] Date of Patent: Nov. 19, 1996

[54] EPOXY ACRYLATES

[75] Inventors: Martin Roth, Giffers, Switzerland; Roger Salvin, Weil am Rhein, Germany; Kurt Meier, Therwil; Bernhard Sailer, Basel, both of Switzerland; Rolf Wiesendanger, Riehen, Switzerland

[73] Assignee: Ciba-Geigy Corporation, Tarrytown, N.Y.

[21] Appl. No.: 268,095

[22] Filed: Jun. 28, 1994

[30] Foreign Application Priority Data

Jul. 2, 1993 [CH] Switzerland .............................. 2004/93

[51] Int. Cl.$^6$ ..................................................... C08F 283/00
[52] U.S. Cl. ....................... 525/531; 525/476; 525/479; 525/481; 525/488; 525/922; 528/88; 528/103; 528/112; 549/515
[58] Field of Search ....................... 525/531, 913, 525/922, 481, 488, 476, 479; 528/103, 112, 88; 549/515

[56] References Cited

U.S. PATENT DOCUMENTS

| 3,373,079 | 3/1968 | Fekete et al. | 525/531 |
|---|---|---|---|
| 3,676,524 | 7/1972 | Takiyama et al. | 525/502 |
| 4,074,008 | 2/1978 | Green | 430/280 |
| 4,359,370 | 11/1982 | de la Mare et al. | 528/112 |
| 4,595,734 | 6/1986 | O'Hearn | 525/523 |
| 4,789,620 | 12/1988 | Sasaki et al. | 430/281 |
| 4,925,773 | 5/1990 | Miyamura et al. | 430/285 |
| 5,069,956 | 12/1991 | Murath et al. | 523/412 |
| 5,157,078 | 10/1992 | Woo et al. | 525/109 |
| 5,218,061 | 6/1993 | Kajiwara et al. | 525/523 |
| 5,319,060 | 6/1994 | Nishikawa et al. | 525/531 |

FOREIGN PATENT DOCUMENTS

| 0273729 | 7/1988 | European Pat. Off. . |
|---|---|---|
| 0418011 | 3/1991 | European Pat. Off. . |
| 3-059022 | 7/1989 | Japan . |
| 1195056 | 7/1989 | Japan . |
| 04294352 | 3/1991 | Japan . |
| 1187652 | 3/1967 | United Kingdom . |
| 2175908 | 12/1986 | United Kingdom . |
| 2253629 | 9/1992 | United Kingdom . |
| 8907785 | 8/1989 | WIPO . |

*Primary Examiner*—John C. Bleutge
*Assistant Examiner*—Randy Gulakowski
*Attorney, Agent, or Firm*—David R. Crichton

[57] ABSTRACT

Novel epoxy acrylates and carboxyl group-containing epoxy acrylates of formulae II and III of the claims that are relatively highmolecular and are chemically crosslinkable can be used in photoresist formulations with the additional use of highly polymerized polymer binders. Such resist formulations are used in particular in the field of printed circuit boards and printing plates, are applicable from aqueous medium, are almost tack-free and have very good edge coverage, especially on conductors.

6 Claims, No Drawings

EPOXY ACRYLATES

The present invention relates to novel epoxy acrylates of higher molecular weight and to novel polymolecular carboxyl group-containing epoxy acrylates, to the preparation thereof, to the use of said acrylates in photoresist formulations, and to the use of said formulations, in particular in the field of printed wiring boards and printing plates.

Epoxy acrylates are known in abundance and are also used, inter alia, in compositions used as photoresist formulations, for example in GB 2 175 908, in which resins derived from an unsaturated polybasic acid anhydride and a reaction product of an epoxy acrylate and an unsaturated monocarboxylic acid are used.

Formulations for solder resists that contain reaction products of epoxy novolak resins with acrylic acid and cyclic carboxylic anhydrides are disclosed, inter alia, in EP 0 273 729. They are developable in aqueous alkaline media and have good thermal resistance and photosensitivity. Their resistance to chemicals, however, is unsatisfactory.

EP 0 418 011 discloses compositions for solder masks that are likewise based on reaction products of epoxy cresol novolaks with acrylic acid and cyclic dicarboxylic anhydrides, using 0.4 to 0.9 equivalent of acrylic acid per equivalent of epoxy group, such that the final product simultaneously contains acid and epoxy groups in the same molecule. A second thermal crosslinking reaction between these two functionalities is thereby made possible in the application of these resist compositions. The problem here is, however, aside from the preparation of the products (danger of gelation in the reaction with the anhydride), the storage stability, as the formulation containing such reaction products has a certain reactivity even at room temperature.

All these cited epoxy acrylates are quite generally relatively low-molecular.

Photochemically or thermally cured epoxy acrylates that are derived from low molecular epoxy resins and epoxy novolaks are known for their good thermal and mechanical properties as well as for their good resistance to aggressive chemicals. However, the tackiness and edge coverage of the resist films obtained with these systems on conductors owing to the fairly low relative molar mass are unsatisfactory. In practical application it is therefore often necessary to avoid these shortcomings by adding highly polymerised polymer binders. Such binders normally contain no functional acrylate groups and do not react concurrently during the photochemical or thermal cure, i.e. they are not incorporated as "passive" components in the network and therefore result in a dilution of the network density, which, in turn, adversely affects in particular the resistance to chemicals and the electrical properties of processed resist layers. Furthermore, the photosensitivity decreases as a consequence of the "dilution" of the acrylate groups. The addition of highly polymerised polymer binders induces high viscosity of these formulations even if the solids content is relatively low and therefore often results in serious problems in coating.

Japanese patent Kokai Hei 04-294352 discloses the modification of epoxy-novolak resins by reaction with an unsaturated monocarboxylic acid and subsequently with an unsaturated anhydride of a polycarboxylic acid and the use thereof in photosensitive aqueous formulations.

It is therefore the object of this invention to provide acrylates that do not have the shortcomings referred to above.

This object is achieved in the practice of this invention by novel epoxy acrylates and novel carboxyl group-containing epoxy acrylates of higher molecular weight which, when used in resist formulations, are able to function without or with only minor amounts (<10% by weight) of additional polymer binders. They are obtained by reaction of so-called "advanced" epoxy resins with, typically, (meth)acrylic acid.

Specifically, the invention provides novel epoxy acrylates of formula II

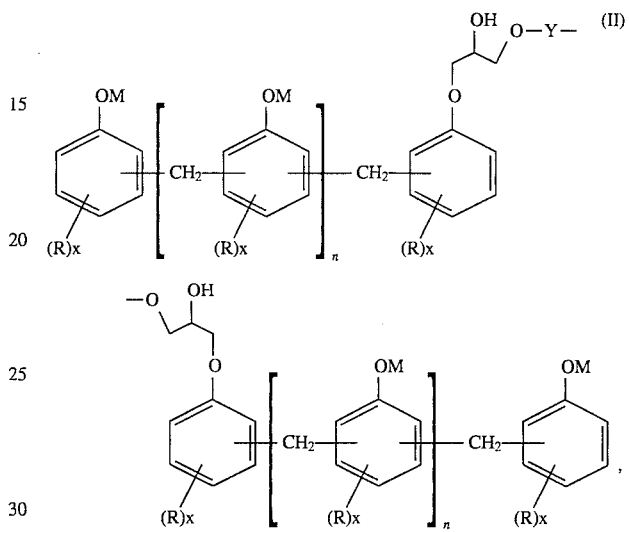

wherein

M is the group of formula

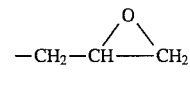

or

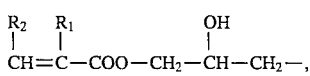

$R_1$ is —H or —$CH_3$, $R_2$—H, —$CH_3$ or phenyl,

R is $C_1$–$C_4$ alkyl or halogen, preferably $CH_3$ or Br, x is an integer from 0 to 3, preferably 0 or 1, and Y is a linking group of formula

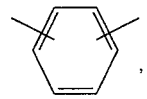

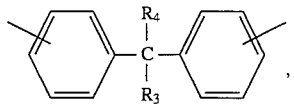

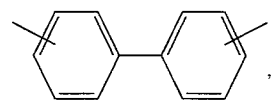

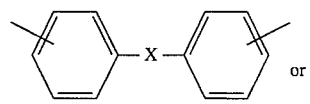 or

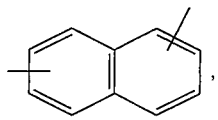 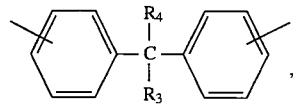

wherein $R_3$ and $R_4$ are each independently of the other hydrogen or $C_1$–$C_4$alkyl, or $R_3$ and $R_4$, together with the linking carbon atom, form a 5- or 6-membered hydrocarbon ring, and the aromatic radicals of the linking group Y are unsubstituted or substituted by halogen or $C_1$–$C_4$alkyl, wherein $R_3$ and $R_4$ are —H or $C_1$–$C_4$alkyl and the aromatic radicals of the linking group are unsubstituted or substituted by halogen or $C_1$–$C_4$alkyl.

The novel epoxy acrylates of formula II may be obtained by reacting an advanced epoxy novolak of formula I

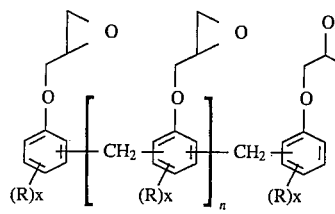 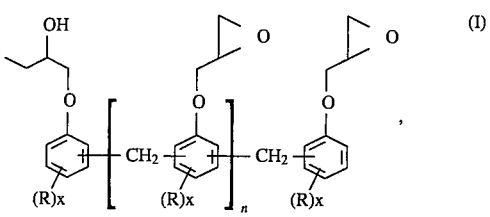 (I)

X is —S—, —O—, or —SO$_2$—, and n is an integer from 0 to 300, preferably from 0 to 30, with the proviso that at least 10 mol % of the radicals M have the structure of formula

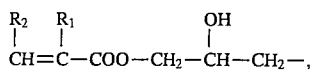

in which $R_1$ and $R_2$ are as defined above.

If the aromatic radicals of the linking group Y are substituted, then suitable halogen substituents are fluoro, chloro and, preferably, bromo; and suitable $C_1$–$C_4$alkyl substituents are straight-chain or branched $C_1$–$C_4$alkyl groups such as methyl, ethyl, n- and isopropyl, n-, sec- and tert-butyl.

Particularly preferred linking groups Y have the formula

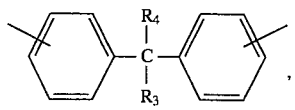

wherein $R_3$ and $R_4$ are as defined above and, in particular, have the formulae

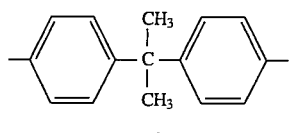

and

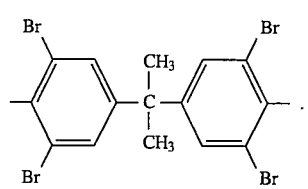

Preferred epoxy acrylates have the formula II, wherein R is —H (for x=0) or —CH$_3$, $R_1$ is —H or —CH$_3$, $R_2$ is —H, x is 0 or 1, n is an integer from 0 to 30, and Y is a linking group of formula wherein R, Y, n and x are as defined for formula II, with an ethylenically unsaturated monocarboxylic acid, if necessary in the presence of a catalyst and of a polymerisation inhibitor, at elevated temperature.

The advanced epoxy novolaks of formula I are known (q.v. inter alia JP patent Kokai Hei 1-195056) and are prepared from a bisphenol of formula HO—Y—OH, wherein Y is as defined above, and an epoxy novolak, in known manner, the molar amount of bisphenol being conveniently 0.01 to 0.1 mol per epoxy group in the epoxy novolak.

These advanced epoxy novolaks of formula I carry secondary aliphatic hydroxyl groups.

The reaction of the advanced epoxy novolaks of formula I to give the novel epoxy acrylates of formula II is carried out in known manner, conveniently by reaction with an ethylenically unsaturated monocarboxylic acid of formula

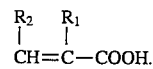

Suitable acids are crotonic acid, cinnamic acid and, preferably, acrylic acid or methacrylic acid or a mixture thereof. $R_1$ and $R_2$ have the meanings given above.

It is preferred to use a catalyst in this reaction. Particularly suitable catalysts are metal salts such as chromium compounds, amines such as triethylamine or benzyldimethylamine, also ammonium salts such as benzyltrimethylammonium chloride, or also triphenylphosphine and triphenylbismuth.

A solvent may be added to the reaction, as the advanced epoxy resins of formula I are in the form of solids. However, the solvent must be inert to the educt. Suitable solvents include: ketones such as acetone, methyl ethyl ketone, cyclohexanone; esters such as ethyl and butyl acetate, ethoxyethyl acetate or methoxypropyl acetate; ethers such as dimethoxyethane and dioxane; aromatic hydrocarbons such as toluene, benzene and xylenes, as well as mixtures of two or more of these solvents.

The temperature will conveniently be in the range from 80° to 140° C., the reaction with acrylic acid being preferably carried out in the range from 80° to 120° C. and that with methacrylic acid preferably in the range from 80° to 140° C.

A polymerisation inhibitor may also be added to the reaction medium, suitably hydroquinone, hydroquinone monomethyl ether and 2,6-di-tert-butyl-p-cresol.

It is desirable to introduce air or a mixture of nitrogen/oxygen into the reaction medium, as some of the aforementioned polymerisation inhibitors are effective only in the presence of oxygen. Depending on the amount of ethylenically unsaturated monocarboxylic acid used, epoxy acrylates of formula II that are completely or only partially acrylated are obtained. The monocarboxylic acid can be used in equimolar amounts with respect to the epoxy groups or in less than equivalent amount. The completely reacted epoxy acrylates contain almost no more epoxy groups.

The novel epoxy acrylates of formula II usually need neither be isolated from the reaction medium nor purified. The reaction solution can be used direct as obtained in the synthesis.

The partially as well as the completely reacted products of formula II contain aliphatic hydroxyl groups originating from the reaction of the epoxy groups with the ethylenically unsaturated monocarboxylic acid. They may additionally contain aliphatic hydroxyl groups from the educt.

The completely acrylated epoxy acrylates of formula II can then be further reacted to carboxyl group-containing epoxy acrylates of formula III comprises reacting the epoxy acrylate of formula II with the cyclic anhydride, in the absence or presence of a catalyst and of a polymerisation inhibitor, at elevated temperature. The OH groups of the compounds of formula II are completely or partially acylated, accompanied by ring opening of the anhydride. It is therefore advantageous that the epoxy acrylates of formula II contain no more epoxy groups, otherwise gelation occurs. The reaction is known per se.

Suitable cyclic anhydrides of polycarboxylic acids typically include succinic anhydride, maleic anhydride, glutaric anhydride, tetrahydrophthalic anhydride, itaconic anhydride, phthalic anhydride, hexahydrophthalic anhydride, 3-methyl- and 4-methylhexahydrophthalic anhydride, 3-ethyl- and 4-ethylhexahydrophthalic anhydride, 3-methyl-, 3-ethyl-, 4-methyl- and 4-ethyltetrahydrophthalic anhydride, and trimellitic anhydride.

Preferred anhydrides are succinic, tetrahydrophthalic, hexahydrophthalic and phthalic anhydride.

Suitable catalysts typically include amines such as triethylamine, benzyldimethylamine, pyridine or dimethylaminopyridine, or triphenylphosphine or metal salts such as chromium or zirconium compounds.

If desired, a solvent may be added to the reaction medium, as the epoxy acrylates of formula II are in the form of solids. The solvent must, however, be inert to the cyclic anhydride,

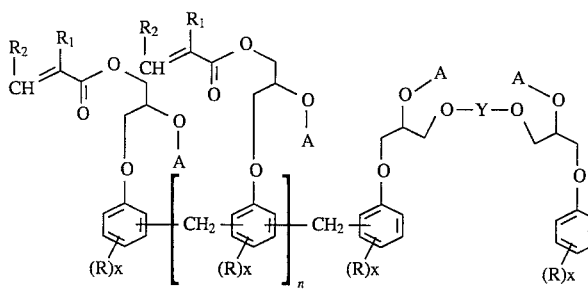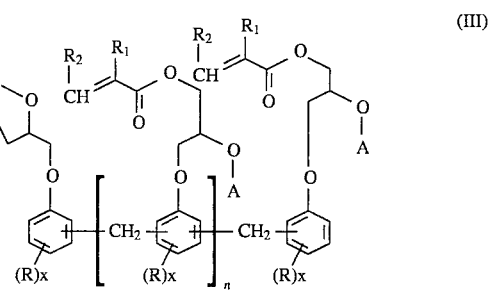

(III)

wherein

A is hydrogen or the group of formula

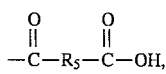

and $R_1$, $R_2$, R, n, x and Y are as defined above for formula II and $R_5$ is the radical of a cyclic anhydride of a polycarboxylic acid after removal of the anhydride radical, and at least 10 mol % of the radicals A, as in formula II, have the structure of formula

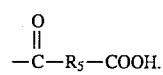

Preferred epoxy acrylates of formula III correspond to the preferred epoxy acrylates of formula II as indicated above, and the radicals $R_1$, $R_2$, R, x, n and Y in formula III have the same preferred meanings as given in connection with formula II.

As the completely reacted epoxy acrylates of formula II contain almost no more epoxy groups, they can be reacted with cyclic anhydrides of polycarboxylic acids. In this case, the aliphatic hydroxyl groups (formula II) react with the cyclic anhydride to effect ring opening and hemiester formation. In this reaction, for each reacted hydroxyl group a carboxylic acid bonded to the resin forms. The reaction so that hydroxyl group-containing solvents are not suitable. The solvents cited in connection with the reaction with the ethylenically unsaturated monocarboxylic acids may suitably be used, provided they contain no functional groups that react with anhydrides.

The reaction temperature is conveniently in the range from 60° to 140° C., and suitable polymerisation inhibitors are typically hydroquinone, hydroquinone monomethyl ether and 2,6-di-tert-butyl-p-cresol.

It is desirable to introduce dry air or a mixture of nitrogen/oxygen into the reaction medium. In a preferred embodiment of the invention, the epoxy acrylates of formula II are further reacted, without isolation, in the same reactor to the derivatives of formula III modified with carboxyl groups.

Isolation and purification of the novel carboxyl group-containing epoxy acrylates of formula III is usually not necessary. The reaction solution can be further used as obtained in the synthesis.

Owing to the unsaturated groups present in the molecule, the epoxy acrylates of formula II and the carboxyl group-containing epoxy acrylates of formula III are thermally and photochemically crosslinkable. They can therefore be used and applied as acrylate components in photoresist formulations for the production of solder resists or primary resists by known methods, as for example disclosed in Swiss patent application 2005/93-4, filed on 2nd Jul. 1993, entitled "Photopolymerisable compositions", and give resist layers having enhanced thermal, mechanical, electrical and chemical properties. The resist formulations prepared therefrom are used in particular in the field of printed wiring boards as solder resists or primary resists (etch resist or galvanoresist), and of printing plates. Suitable developers are aqueous as well as aqueous-organic or organic systems. Owing to the presence of carboxyl groups in the compounds of formula III, these systems are particularly suitable for the preparation of aqueous-alkaline developable photoresists.

Compared with low molecular epoxy acrylates in formulations that contain polymer binders, it is surprising that formulations containing epoxy acrylates of higher molecular weight without the addition of such polymer binders bring about an enhancement and not a loss of photosensitivity, and also that no increase in tackiness results. Furthermore, use of the formulations as solder resists results in improved edge coverage of the conductors. As no additional polymer binders are used in such formulations, further advantages accrue with respect to the thermal, mechanical and electrical properties and, in particular, to the resistance to chemicals of the resist compositions prepared therefrom. The novel epoxy acrylates of formula II and the carboxyl group-containing epoxy acrylates of formula III have an increased glass transition temperature.

The invention is illustrated by the following non-limitative Examples.

PREPARATIVE EXAMPLES

Advanced epoxy cresol novolaks

Example 1

4000.00 g (18.58 mol of epoxy groups) of epoxy cresol novolak ECN 1299 (ex CIBA-GEIGY) are charged to the reactor and dissolved in 1780 g of methoxypropyl acetate (MPA) by heating to 100° C. Then 4.00 g of a 5% solution of tetramethylammonium chloride (TMAC) in ethanol are added and the reaction mixture is stirred for 10 minutes. The temperature of the resultant clear solution is raised to 130° C. and 165.78 g (0.73 mol) of bisphenol A are then added. The batch is reacted at 130° C. and the reaction course is followed by titration of the epoxy groups as well as by measuring the viscosity in a Brookfield viscosimeter at 25° C., spindle #31 (for measuring the viscosity, the samples are diluted with methoxypropyl acetate down to a solids content of 50%).

Initial values epoxy value=3.09 mol/kg viscosity=141 mPa.s 1 h reaction time: epoxy value=3.03 mol/kg 2.5 h reaction time viscosity=319 mPa.s 3.5 h reaction time: epoxy value=2.85 mol/kg 5 h reaction time: viscosity=474 mPa.s 6 h reaction time: epoxy value=2.85 mol/kg viscosity= 571 mPa.s After 6 hours at 130° C., the reaction is discontinued (after the first 2 hours reaction time the values change only very little).

Analytical data of the reaction product:

solids content (dry weight): 68.4% epoxy value (titration): 2.85 mol/kg (solution)

Brookfield viscosity, 25°; Sp.#31: 571 mPa.s (50% soln. in MPA) GPC (gel permeation chromatography; polystyrene calibration): Mw=16050; Mn=2059

The product conforms to formula I, wherein Y is

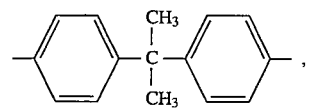

x is 1, R is methyl and n is 0 to 6.

Epoxy acrylates of advanced epoxy cresol novolaks

Example 2

(Example 1, reacted with 100 mol % of acrylic acid):

During the entire duration of the reaction a flow of air is passed in beneath the surface with efficient stirring to ensure good distribution of the air bubbles. The air should desirably be clean, dry and oil-free. 5594.90 g of the reaction product of Example 1 above (63% solution in methoxypropyl acetate; 15.95 mol of epoxy groups), 446.50 g of methoxypropyl acetate and 4.67 g of 2,6-di-tert-butyl-p-cresol are charged to the reactor and heated to 100° C. Then the remaining reactants are added, viz. 1149.00 g of acrylic acid and 93.50 ml of Nuosynchromium 5 (supplied by HARCROS-Durham Chemicals, Durham DH3 1QX, GB) (10% solution in methoxypropyl acetate).

The batch is reacted at 105°–110° C. The reaction is initially exothermic, so that 15 min after the start of the reaction it is necessary to cool with a water bath.

After a reaction time of c. 45 min, the cooling bath is removed and heating is continued with an oil bath. The reaction course is followed by titration of the acid content.

Initial value: 2.19 mol/kg 1 h reaction time: 0.89 mol/kg 2 h reaction time 0.55 mol/kg 3 h reaction time: 0.09 mol/kg 5 h reaction time: 0.11 mol/kg 7.5 h reaction time: 0.065 mol/kg After a reaction time of 7.5 h the reaction is discontinued and the product is drawn off warm.

Analytical data of the reaction product:

1. solids content (dry weight): 68%
2. epoxy value (titration): 0.05 mol/kg
3. acid content (titration): 0.065 mol/kg
4. Brookfield viscosity, 25°, Sp.#31: 28100 mPa.s (solution diluted to 63.6% with MPA)
5. GPC: Mw=23978; Mn=3132

The product conforms to formula II, wherein x, Y and R are as defined in Example 1, M is the group

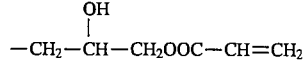

and n is 0 to 6.

Carboxylic Groups Containing Acrylates of Advanced Epoxy Cresol Novolaks According to Formula III Example 3

The apparatus used consists of a 5000 ml reactor equipped with stirrer, thermometer, reflux condenser and an inlet pipe for air. To inhibit the polymerisation of the acrylates, a weak flow of air is introduced during the reaction below the surface. Heating is carried out with a thermostatically controlled oil bath. 313.27 g (0.73 mol of OH groups) of the reaction product of Example 2 and 147.14 g of methoxypropyl acetate are charged to the reactor and heated to 100° C.

Then 36.37 g (0.36 mol) of succinic anhydride and 1.25 g of pyridine as catalyst are added and the batch is reacted for 4 hours at this temperature. The homogeneous reaction product is further used without additional purification.

Analytical data of the reaction product:
1. solids content: 51%
2. acid content (titration): 0.785 mol/kg
3. viscosity (Brookfield): 2890 mPa.s at 25° C.

The product conforms to formula III, wherein x, Y and R are as defined in Example 1, $R_1$ and $R_2$ are H, n is 0 to 6 and A is 50 mol % of the group

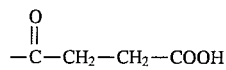

and 50 mol % of —H.

Example 4

The apparatus of Example 3 is used. 341.18 g (0.73 mol of OH groups) of the reaction product of Example 2 (solids content=69.2%) and 204 g of methoxypropyl acetate are charged to the reactor and heated to 105° C. Then 72.33 g (0.475 mol) of tetrahydrophthalic anhydride and 1.55 g of pyridine as catalyst are added and the batch is reacted for 8 hours at 110° C. The homogeneous reaction product is further used without additional purification.

Analytical data of the reaction product:
1. solids content: 49.7%
2. acid content (titration): 0.82 mol/kg The product conforms to formula III, wherein x, Y, R, $R_1$, $R_2$ and n are as defined in Example 3 and A is 65 mol % of the group

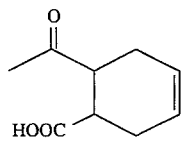

and 35 mol % of —H.
Advanced epoxy cresol novolaks (according to formula I)

Example 5

[Advancement with tetrabromobisphenol A]:

2000.00 g (9.29 mol of epoxy groups) of epoxy cresol novolak ECN 1299 are charged to the reactor and dissolved in 940 g of methoxypropyl acetate (MPA) by heating to 100° C. Then 2.00 g of a 5% solution of tetramethylammonium chloride (TMAC) in ethanol are added and the batch is stirred for 10 minutes. The temperature of the clear solution is raised to 130° C. and 200.00 g (0.36 mol) of tetrabromobisphenol A are added. The batch is reacted at 130° C. and the reaction course is followed by titration of the epoxy groups as well as by measuring the viscosity. After 6 hours at 130° C., the reaction is discontinued.

The reaction product can be used direct for the next step.

Analytical data:
1. solids content (dry weight): 71%
2. epoxy value (titration): 2.75 mol/kg (soln.)
3. Brookfield viscosity, 25° C., sp.#31: 571 mPa.s (50% soln.)
4. GPC (polystyrene calibration): Mw=19492; Mn=2126.

Example 6

[Advancement with bis(4-hydroxyphenyl)sulfone]:
1400.00 g of ECN 1299,
627.00 g of methoxypropyl acetate,
1.40 g of 5% tetramethylammonium chloride in ethanol, and
63.42 g of bis(4-hydroxyphenyl)sulfone
are reacted in accordance with the procedure of Example 5 for 6 hours at 130° C. The following analytical data are obtained for the reaction product:
1. epoxy value (titration): 2.88 mol/kg (solution)
2. GPC (polystyrene calibration): Mw=12863; Mn=1972

Example 7

[Advancement with 4,4'-dihydroxybiphenyl]:
200.00 g of ECN 1299,
89.00 g of methoxypropyl acetate,
0.20 g of 5% tetramethylammonium chloride in ethanol, and
6.74 g of 4,4'-dihydroxybiphenyl
are reacted in accordance with the procedure of Example 5 for 6 hours at 130° C. The following analytical data are obtained for the reaction product:
1. epoxy value (titration): 2.82 mol/kg (solution)

Example 8

[Advancement with bisphenol A]:
1600.00 g of ECN 1299,
727.00 g of methoxypropyl acetate,
1.60 g of 5% tetramethylammonium chloride in ethanol, and
92.40 g of bisphenol A
are reacted in accordance with the procedure of Example 5 for 6 hours at 130° C. The following analytical data are obtained for the reaction product:
1. solids content (dry weight): 67%
2. epoxy value (titration): 2.74 mol/kg (soln.)
3. GPC (polystyrene calibration): Mw=25725; Mn=2257.
Epoxy acrylates of advanced epoxy cresol novolaks (according to formula II

Example 9

[Ex. 5, reacted with 75 mol % of acrylic acid]

During the entire duration of the reaction a flow of air is passed in beneath the surface with efficient stirring to ensure good distribution of the air bubbles. The air should be clean, dry and oil-free.

4646.30 g of the reaction product Example 5 (c. 70% solution in methoxypropyl acetate; 12.36 mol of epoxy groups), 702.70 g of methoxypropyl acetate and 3.91 g of 2,6-di-tert-butyl-p-cresol are charged to the reactor and heated to 80° C. Then the remaining reactants are added, viz. 667.90 g of acrylic acid and 78.20 ml of a 10% dilute solution of Nuosynchromium 5 (10.00 g of commercial product+90.00 g of methoxypropyl acetate). The batch is reacted at 105°–110° C. and the reaction course is followed by titration of the acid content. After a reaction time of 2.5 hours, the acid content is 0.00 mol/kg, the reaction is complete and the product is drawn off warm.

Analytical data:
1. solids content (dry weight): 65.40%
2. epoxy value (titration): 0.60 mol/kg
3. acid content (titration): 0.00 mol/kg
4. Brookfield viscosity, 25° C., sp.#31: 675 mPa.s (50% soln.)
5. GPC (polystyrene calibration): Mw=25084; Mn=3004.

Example 10

[Ex. 5, reacted with 10 mol % of acrylic acid]

The following components are reacted in accordance with the procedure described in Example 9:
500.00 g of the dilute reaction product of Example 5 (57% solution in methoxypropyl acetate; 1.12 mol of epoxy groups),
8.03 g of acrylic acid,
0.29 g of 2,6-di-tert-butyl-p-cresol, and
5.84 ml of Nuosynchromium 5, 10% solution in methoxypropyl acetate.

The following analytical data are obtained for the reaction product:
1. solids content (dry weight): 57.40%
2. epoxy value (titration): 1.99 mol/kg
3. acid content (titration): 0.05 mol/kg
4. Brookfield viscosity, 25° C., sp.#31: 3510 mPa.s
5. GPC (polystyrene calibration): Mw=24113; Mn=2565.

Example 11

[Ex. 1, reacted with 65 mol % of acrylic acid]

The following components are reacted for 4 hours in accordance with the procedure described in Example 9:
900.00 g of the reaction product of Example 1, (69% solution in methoxypropyl acetate; 2.56 mol/kg of epoxy groups),
119.72 g of acrylic acid,
105.04 g of methoxypropyl acetate,
0.74 g of 2,6-di-tert-butyl-p-cresol, and
14.81 ml of Nuosynchromium 5, 10% solution in methoxypropyl acetate.

The following analytical data are obtained for the reaction product:
1. solids content (dry weight): 67.40%
2. epoxy value (titration): 0.81 mol/kg
3. acid content (titration): 0.05 mol/kg
4. Brookfield viscosity, 25° C., sp.#31: 43400 mPa.s
5. GPC (polystyrene calibration): Mw=27770; Mn=28 15.

Example 12

[Ex. 8, reacted with 75 mol % of acrylic acid]

The following components are reacted in accordance with the procedure described in Example 9:
200.00 g of the reaction product of Example 8 (0.548 mol of epoxy groups),
29.61 g of acrylic acid,
31.32 g of methoxypropyl acetate,
0.17 g of 2,6-di-tert-butyl-p-cresol, and
3.40 ml of Nuosynchromium 5, 10% solution in methoxypropyl acetate.

The following analytical data are obtained for the reaction product:
1. solids content (dry weight): 65.20%
2. epoxy value (titration): 0.51 mol/kg
3. acid content (titration): 0.05 mol/kg
4. GPC (polystyrene calibration): Mw=44949; Mn=2997.

Example 13

[Ex. 6, reacted with 100 mol % of acrylic acid]

The following components are reacted for 8 hours in accordance with the procedure described in Example 2:
298.00 g of the reaction product of Example 6 (0.854 mol of epoxy groups),
61.60 g of acrylic acid,
52.00 g of methoxypropyl acetate,
0.27 g of 2,6-di-tert-butyl-p-cresol, and
5.42 ml of Nuosynchromium 5, 10% solution in methoxypropyl acetate.

The following analytical data are obtained for the reaction product:
1. epoxy value (titration): 0.03 mol/kg
2. acid content (titration): 0.06 mol/kg,

Example 14

[Ex. 7, reacted with 100 mol % of acrylic acid]

The following components are reacted for 8 hours in accordance with the procedure described in Example 2:
295.00 g of the reaction product of Example 7 (0.83 mol of epoxy groups),
60.06 g of acrylic acid,
50.00 g of methoxypropyl acetate,
0.36 g of 2,6-di-tert-butyl-p-cresol, and
5.34 ml of Nuosynchromium 5, 10% solution in methoxypropyl acetate.

The following analytical data are obtained for the reaction product:
1. epoxy value (titration): 0.06 mol/kg
2. acid content (titration): 0.00 mol/kg.

Carboxyl group-containing acrylates of advanced epoxy cresol novolaks (according to formula III)

Example 15

[Ex. 2, reacted with 70 mol % of succinic anhydride]

The following components are reacted for 6 hours in accordance with the procedure described in Example 3:
434.50 g of the reaction product of Example 2 (66% solution with OH number=2.1 mol/kg; 0.92 mol of OH groups),
64.45 g of succinic anhydride,
41.38 g of methoxypropyl acetate, and
1.76 g of pyridine.

The following analytical data are obtained for the reaction product:
1. solids content (dry weight): 65.60%
2. acid content (titration): 1.31 mol/kg.

Example 16

[Ex. 2, reacted with 80 mol % of tetrahydrophthalic anhydride with 4-dimethylaminopyridine as catalyst]

The following components are reacted for 7 hours in accordance with the procedure described in Example 3:
500.00 g of the reaction product of Example 2 (1.04 mol of OH groups),
126.83 g of tetrahydrophthalic anhydride,
76.83 g of methoxypropyl acetate, and
0.23 g of 4-dimethylaminopyridine The following analytical data are obtained for the reaction product:
1. solids content (dry weight): 48.40%
2. acid content (titration): 1.02 mol/kg
4. Brookfield viscosity, 25° C., sp.#31: 2340 mPa.s

Example 17

[Ex. 2, reacted with 65 mol % of phthalic anhydride]

The following components are reacted for 8 hours in accordance with the procedure described in Example 3:
328,80 g of the reaction product of Example 2 (0.70 mol of OH groups),
67.86 g of phthalic anhydride, 194.77 g of methoxypropyl acetate, and
1.48 g of pyridine.

The following analytical data are obtained for the reaction product:
1. solids content (dry weight): 43.90%
2. acid content (titration): 0.88 mol/kg.

Example 18

[Ex. 13, reacted with 65 mol % of tetrahydrophthalic anhydride]

The following components are reacted for 6 hours in accordance with the procedure described in Example 3:
398,80 g of the reaction product of Example 13 (0.85 mol of OH groups),
89.00 g of tetrahydrophthalic anhydride,
190.00 g of methoxypropyl acetate, and
1.68 g of pyridine.

The following analytical data are obtained for the reaction product:
1. solids content (dry weight): 51.10%
2. acid content (titration): 0.95 mol/kg.

Example 19

[Ex. 14, reacted with 65 mol % of tetrahydrophthalic anhydride]

The following components are reacted for 4.5 hours in accordance with the procedure described in Example 3:
400,00 g of the reaction product of Example 14 (0.83 mol of OH groups),
86.76 g of tetrahydrophthalic anhydride,
211.20 g of methoxypropyl acetate, and
1.76 g of pyridine.

The following analytical data are obtained for the reaction product:
1. solids content (dry weight): 46.00%
2. acid content (titration): 0.91 mol/kg.

Epoxy methacrylates of advanced epoxy cresol novolaks (according to formula II)

Example 20

[Ex. 1, reacted with 50 mol % of methacrylic acid]

The following components are reacted for 4 hours in accordance with the procedure described in Example 9:
300.00 g of the reaction product of Example 1 (70% solution in methoxypropyl acetate; 2.85 mol/kg of epoxy groups; corresponds to 0.855 mol of epoxy groups),
36.80 g of methacrylic acid,
37.96 g of methoxypropyl acetate,
0.25 g of 2,6-di-tert-butyl-p-cresol, and
4.94 ml of Nuosynchromium 5, 10% solution in methoxypropyl acetate.

The following analytical data are obtained for the reaction product:
1. solids content (dry weight): 64.80%
2. epoxy value (titration): 1.10 mol/kg
3. acid content (titration): 0.00 mol/kg
4. Brookfield viscosity, 25° C., sp.#31: 27000 mPa.s
5. GPC (polystyrene calibration): Mw=28981; Mn=2809, Application Examples General procedure:

The coating substrates used are cleansed copper-clad electronic laminates or processed printed circuit boards with conductive pattern. The resist formulations are prepared by mixing and dissolving the components listed in the Examples, followed by optional filtration. All operations are carried out under protective yellow light.

For test purposes, the formulations can be coated on to the printed circuit board with a wire applicator. For larger series, curtain coating methods or roller coating as well as screen printing are used.

Drying is carried out in a circulating air oven. Exposure is made using a commercial apparatus with 5000 W mercury high-pressure radiation source doped with metal halide. Development is carried out in commercial continuous development apparatus. Assessment of photosensitivity and resolution is made by exposure through a Stouffer step wedge and resolution wedge and the result is evaluated from the developed resist image.

Formulation 1.1 comprises a novel epoxy acrylate:
80.00 g of the reaction product of Example 2 corresponding to Example 4 (as 50% solution in methoxypropyl acetate);
13.00 g of Sartomer 295 (pentaerythritol tetraacrylate)
3.00 g of Irgacure 907 (photoinitiator; CIBA AG, Basel);
1.50 g of Quantacure ITX (isopropylthioxanthone; sensitiser);
0.15 g of Orasol blue GN (dye sold by CIBA AG, Basel);

Formulation 1.2: Comparison Example with a highly polymerised binder and without novel epoxy acrylate:
133.33 g of Scripset 550E solution (30% solution in methoxypropyl acetate; polymer binder sold by Monsanto; styrene/maleic acid copolymer);
13.00 g of Sartomer 295;
3.00 g of Irgacure 907;
1.50 g of Quantacure ITX;
0.15 g of Orasol blue GN.

Result

|  | Formulation 1.1 | Formulation 1.2 (Comparison) |
|---|---|---|
| solids content | 59% | 38.2% |
| viscosity 25° C. (Epprecht) | 2200 mPa.s | 3000 mPa.s |
| dry layer thickness | 121 μm | 12 μm |
| drying conditions | 5 min 80° C. | 5 min 80° C. |
| exposure | 150 mJ/cm² | 150 mJ/cm² |
| development | 1% Na carbonate 35° C. | 1% Na carbonate 35° C. |
| last visible wedge step | 11 | 2–3 |

Formulation 1.1 containing the novel epoxy acrylate (Example 4) has a lower viscosity than formulation 1.2, despite the substantially higher solids content. The photosensitivity with 11 imaged wedge steps is very much higher than when using comparison formulation 1.2 with only 2 to 3 imaged wedge steps.

What is claimed is:
1. An epoxy acrylate of formula II

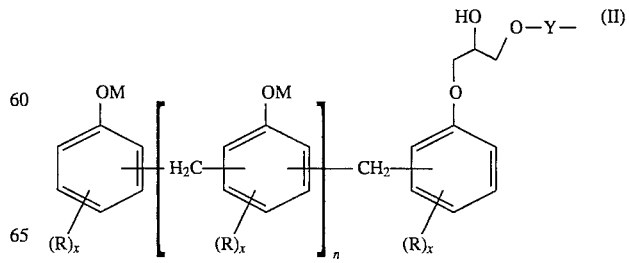

-continued

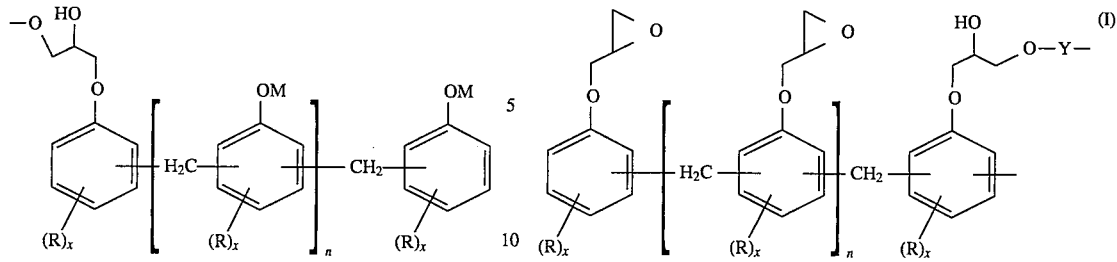

wherein
M is the group of formula

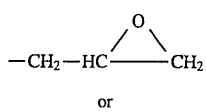

or

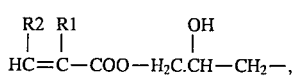

$R_1$ is —H or —$CH_3$, $R_2$—H, —$CH_3$ or phenyl,
R is $C_1$–$C_4$alkyl or halogen,
x is an integer from 0 to 3, and
Y is a linking group of formula

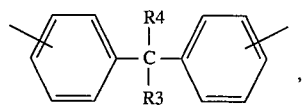

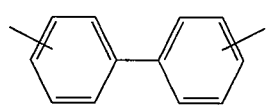

or

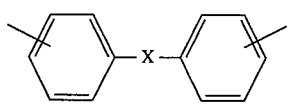

wherein $R_3$ and $R_4$ are each independently of the other hydrogen or $C_1$–$C_4$alkyl and the aromatic radicals of the linking group Y are unsubstituted or substituted by halogen or $C_1$–$C_4$alkyl,
X is —O—, or —$SO_2$—, and
is an integer from 0 to 300,
with the proviso that at least 10 mol % of the radicals M have the structure of formula

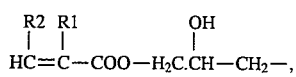

in which $R_1$ and $R_2$ are as defined above and with the proviso that the advanced epoxy novolak of formula I

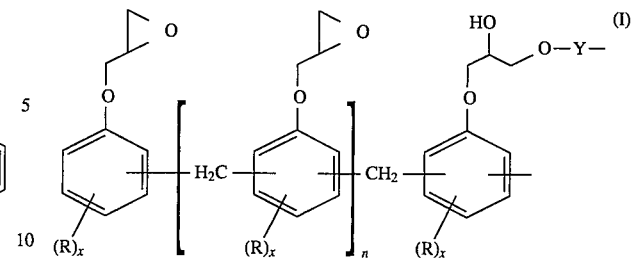

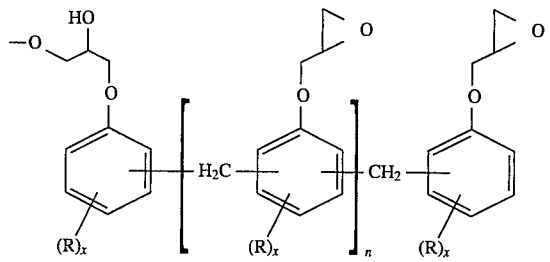

used as starting material for the preparation of the epoxy novolak of the above-identified formula II is obtained by polyaddition of a bisphenol of formula HO—Y—OH to the epoxy novolak in a molar amount of bisphenol being 0.01. to 0.1 mol per epoxy group in the epoxy novolak, wherein Y, R, and x in formula I have the above definitions.

2. An epoxy acrylate of formula II according to claim 1, wherein R is —H or —$CH_3$, $R_1$ is —H or —$CH_3$, $R_2$ is —H, x is 0 or 1, n is an integer from 0 to 30, and Y is a linking group of formula

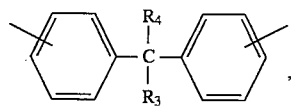

wherein $R_3$ and $R_4$ are —H or $C_1$–$C_4$alkyl and the aromatic radicals of the linking group are unsubstituted or substituted by halogen or $C_1$–$C_4$alkyl.

3. An epoxy acrylate of formula II according to claim 1, wherein Y is a linking group of formula

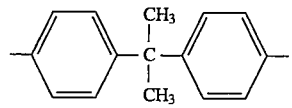

or

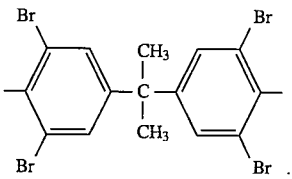

4. An epoxy acrylate of formula II according to claim 1, wherein $R_1$ is —H or —CH$_3$ and $R_2$ is —H.

5. A process for the preparation of an epoxy acrylate of formula II as claimed in claim 1, which comprises reacting an advanced epoxy novolak of formula I

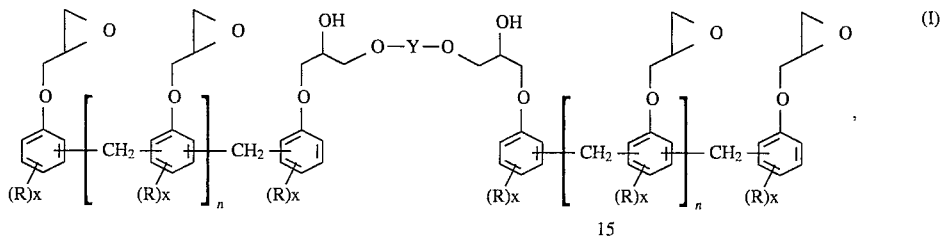

wherein R, Y, n and x are as defined in claim 1, with an ethylenically unsaturated monocarboxylic acid, in the absence or presence of a catalyst and of a polymerisation inhibitor, at elevated temperature.

6. A method for preparing photoresist formulations comprising the use of an epoxy acrylate of formula II as claimed in claim 1 as acrylate component.

* * * * *